US010752738B2

(12) United States Patent
Wang et al.

(10) Patent No.: US 10,752,738 B2
(45) Date of Patent: Aug. 25, 2020

(54) WATER-BASED RESIN COMPOSITION AND ARTICLES MADE THEREFROM (71) Applicant: Allegiance Corporation, Dublin, OH (US)

(72) Inventors: Shiping Wang, Libertyville, IL (US); Seong Fong Chen, Penang (MY); Ida Berger, Buffalo Grove, IL (US); Yun-Siung Tony Yeh, Libertyville, IL (US); Wei Cheong Wong, Kulim (MY)

(73) Assignee: ALLEGIANCE CORPORATION, Dublin, OH (US)

( * ) Notice: Subject to any disclaimer, the term of this patent is extended or adjusted under 35 U.S.C. 154(b) by 0 days.

(21) Appl. No.: 16/227,154

(22) Filed: Dec. 20, 2018

(65) Prior Publication Data
US 2019/0292331 A1 Sep. 26, 2019

Related U.S. Application Data (63) Continuation of application No. 12/403,901, filed on Mar. 13, 2009, now abandoned.

(60) Provisional application No. 61/036,605, filed on Mar. 14, 2008.

(51) Int. Cl.
C08J 3/07 (2006.01)
C08L 9/10 (2006.01)
C08K 5/00 (2006.01)
C08C 1/075 (2006.01)
C08J 3/05 (2006.01)

(52) U.S. Cl.
CPC ............... C08J 3/07 (2013.01); C08C 1/075 (2013.01); C08J 3/05 (2013.01); C08K 5/0008 (2013.01); C08L 9/10 (2013.01); C08J 2309/00 (2013.01)

(58) Field of Classification Search
CPC .................... C08J 3/07; C08C 1/075
See application file for complete search history.

(56) References Cited

U.S. PATENT DOCUMENTS

| 3,250,737 | A | 5/1966 | Halper et al. |
| 3,285,869 | A | 11/1966 | Ronay et al. |
| 3,565,870 | A | 2/1971 | Hirokazu |
| 3,813,695 | A | 6/1974 | Podell et al. |
| 3,846,365 | A | 11/1974 | Berg et al. |
| 3,968,067 | A | 7/1976 | Burke, Jr. |
| 3,971,746 | A | 7/1976 | Hirai et al. |
| 3,988,275 | A | 10/1976 | Satake et al. |
| 4,143,109 | A | 3/1979 | Stockum |
| 4,452,879 | A | 6/1984 | Fickes et al. |
| 4,463,120 | A | 7/1984 | Collins et al. |
| 4,499,154 | A | 2/1985 | James et al. |
| 4,575,476 | A | 3/1986 | Podell et al. |
| 4,594,367 | A | 6/1986 | Geissel et al. |
| 4,849,478 | A | 7/1989 | Mori et al. |
| 5,039,750 | A | 8/1991 | Miller et al. |
| 5,070,540 | A | 12/1991 | Bettcher et al. |
| 5,073,365 | A | 12/1991 | Katz et al. |
| 5,084,514 | A | 1/1992 | Szczechura et al. |
| 5,088,125 | A | 2/1992 | Ansell et al. |
| 5,155,163 | A | 10/1992 | Abeywardena et al. |
| 5,254,635 | A | 10/1993 | Stevenson et al. |
| 5,278,264 | A | 1/1994 | Spaleck et al. |
| 5,284,607 | A | 2/1994 | Chen |
| 5,395,666 | A | 3/1995 | Brindle |
| 5,405,666 | A | 4/1995 | Brindle |
| 5,459,880 | A | 10/1995 | Sakaki et al. |
| 5,486,322 | A | 1/1996 | Fuchs |
| 5,545,451 | A | 8/1996 | Haung et al. |
| 5,564,127 | A | 10/1996 | Manne |
| 5,670,263 | A | 9/1997 | Gazeley |
| 5,741,943 | A | 4/1998 | Bryant et al. |
| 5,742,943 | A | 4/1998 | Chen |
| 5,792,531 | A | 8/1998 | Littleton et al. |
| 5,877,244 | A | 3/1999 | Hoover et al. |
| 5,910,567 | A | 6/1999 | Tanaka et al. |
| 5,993,923 | A | 11/1999 | Lee |
| 5,997,969 | A | 12/1999 | Gardon |

(Continued)

FOREIGN PATENT DOCUMENTS

| DE | 2135266 A1 | 1/1973 |
| EP | 0854174 A1 | 7/1998 |

(Continued)

OTHER PUBLICATIONS

ASTM Standard D 1076-02. "Standard Specification for Rubber—Concentrated, Ammonia Preserved, Creamed, and Centrifuged Natural Latex," published in Sep. 2002. pp. 218-219.
Blackley D.C., High Polymer Latices, 1966, vol. 1, Maclaren & Sons Ltd., Palmerton Publishing Co. Inc., New York, pp. 336-337.
Chen F. B. "Synthetic Polyisoprene Latex," 3rd International Rubber Glove Conference & Exhibition. Sep. 12-14, 2006, Kuala Lumpur, Malaysia. pp. 1-19.
David L.N., et al., Lehninger Principles of Biochemistry, 2004, Fourth Edition, Chapter 10, Freeman W.H., pp. 344-345.

(Continued)

Primary Examiner — Wenwen Cai
(74) Attorney, Agent, or Firm — Arent Fox LLP (57) ABSTRACT An aqueous elastomer dispersion includes a dispersed phase and an aqueous phase. The dispersed phase includes an elastomer including curable aliphatic conjugated-diene elastomers, such as polyisoprene, and a minor amount of at least one additive. The aqueous phase includes water and other optional components in either a soluble state or a dispersion state. The aqueous elastomer dispersion may be prepared by dissolving an elastomer, such as rubber, and additives in a solvent mixture and then converting the resulting solution into an aqueous emulsion. The aqueous emulsion is concentrated and the solvent is stripped from it to yield a dilute latex. The dilute latex that is obtained is concentrated again. Articles made from the aqueous elastomer dispersion include medical gloves, condoms, probe covers, dental dams, finger cots, catheters and the like.

19 Claims, 1 Drawing Sheet

(56) References Cited

U.S. PATENT DOCUMENTS

| | | |
|---|---|---|
| 6,000,061 A | 12/1999 | Taneja et al. |
| 6,019,922 A | 2/2000 | Hassan et al. |
| 6,021,524 A | 2/2000 | Wu et al. |
| 6,075,073 A | 6/2000 | McGlothlin et al. |
| 6,143,416 A | 11/2000 | Brindle et al. |
| 6,263,249 B1 | 7/2001 | Stewart et al. |
| 6,329,444 B1 | 12/2001 | McGlothlin et al. |
| 6,365,278 B1 | 4/2002 | Hoerner et al. |
| 6,391,409 B1 | 5/2002 | Yeh et al. |
| 6,560,782 B2 | 5/2003 | Hourihan et al. |
| 6,566,435 B1 | 5/2003 | Teoh et al. |
| 6,582,788 B2 | 6/2003 | Yeh |
| 6,618,861 B2 | 9/2003 | Saks et al. |
| 6,673,404 B1 | 1/2004 | Yeh et al. |
| 6,737,469 B2 | 5/2004 | Takamura et al. |
| 6,746,562 B2 | 6/2004 | Chino et al. |
| 6,764,731 B2 | 7/2004 | Savoca et al. |
| 6,794,475 B1 | 9/2004 | Bialke et al. |
| 6,828,387 B2 | 12/2004 | Wang et al. |
| 6,887,542 B2 | 5/2005 | Conley et al. |
| 7,037,579 B2 | 5/2006 | Hassan et al. |
| 7,335,807 B2 | 2/2008 | Hochgesang |
| 7,566,502 B1 | 7/2009 | Chen et al. |
| 8,062,755 B2 | 11/2011 | Chen et al. |
| 8,110,266 B2 | 2/2012 | Chen et al. |
| 8,835,014 B2 | 9/2014 | Wang et al. |
| 9,080,025 B2 | 7/2015 | Chen et al. |
| 2002/0002227 A1 | 1/2002 | Porter et al. |
| 2002/0015812 A1 | 2/2002 | Littleton et al. |
| 2002/0066975 A1 | 6/2002 | Elvig |
| 2003/0037530 A1 | 2/2003 | Zhu |
| 2003/0050383 A1 | 3/2003 | Oppenheimer-Stix et al. |
| 2004/0071909 A1 | 4/2004 | McGlothlin et al. |
| 2004/0091504 A1 | 5/2004 | Hamann |
| 2004/0091557 A1 | 5/2004 | Hamann |
| 2004/0105943 A1 | 6/2004 | Hoerner et al. |
| 2004/0169317 A1 | 9/2004 | Wang et al. |
| 2004/0253459 A1 | 12/2004 | Triebes et al. |
| 2005/0031884 A1 | 2/2005 | Koide et al. |
| 2005/0268374 A1 | 12/2005 | Mattesky |
| 2006/0010565 A1 | 1/2006 | Teoh et al. |
| 2006/0026737 A1 | 2/2006 | Chen |
| 2006/0059604 A1 | 3/2006 | Lai et al. |
| 2006/0070167 A1 | 4/2006 | Eng et al. |
| 2006/0099237 A1 | 5/2006 | Modak et al. |
| 2006/0108718 A1 | 5/2006 | Miyamoto et al. |
| 2006/0134613 A1 | 6/2006 | Martin et al. |
| 2006/0141186 A1 | 6/2006 | Janssen et al. |
| 2006/0222688 A1 | 10/2006 | Vveiss; Alan E et al. |
| 2006/0257674 A1 | 11/2006 | Lipinski et al. |
| 2009/0234064 A1 | 9/2009 | Wang et al. |
| 2011/0178234 A1 | 7/2011 | Wang et al. |

FOREIGN PATENT DOCUMENTS

| | | |
|---|---|---|
| EP | 1709879 A2 | 10/2006 |
| EP | 1935925 A1 | 6/2008 |
| GB | 2270618 A | 3/1994 |
| GB | 2411101 A | 8/2005 |
| JP | S5150340 A | 5/1976 |
| JP | H059529 U | 2/1993 |
| JP | H0666688 U | 9/1994 |
| JP | H1161527 A | 3/1999 |
| JP | 2001523759 A | 11/2001 |
| JP | 2002522272 A | 7/2002 |
| JP | 2002309043 A | 10/2002 |
| JP | 2005519144 A | 6/2005 |
| JP | 2006502024 A | 1/2006 |
| JP | 2007501144 A | 1/2007 |
| JP | 2007514575 A | 6/2007 |
| JP | 2009209229 A | 9/2009 |
| JP | 6340758 B2 | 6/2018 |
| WO | 9213497 A1 | 8/1992 |
| WO | 9420574 A2 | 9/1994 |
| WO | 9730839 A1 | 8/1997 |
| WO | 9829484 A1 | 7/1998 |
| WO | 0009320 A1 | 2/2000 |
| WO | 0025840 A1 | 5/2000 |
| WO | 0190236 A1 | 11/2001 |
| WO | 02090430 A1 | 11/2002 |
| WO | 2004037305 A1 | 5/2004 |
| WO | 2004093690 A1 | 11/2004 |
| WO | 2004105525 A1 | 12/2004 |
| WO | 2005068186 A1 | 7/2005 |
| WO | 2008097643 A2 | 8/2008 |
| WO | 2009114788 A2 | 9/2009 |

OTHER PUBLICATIONS

Genencor Fact Sheet, "Synthetic Polyisoprene", downloaded on Jan. 26, 2010 from the internet: http://daniscosugar.com/cms/connect/genencor/products_and_services/business_devlopment/biochemicals/in_focus_bioisoprene/bioisoprene_en.htm, 2008, 7 pages.

Handbook of Preservatives by Michael and Irene Ash, 2004.

Henderson P., "From Isoprene monomer to synthetic polyisoprene latex and its uses," Presentation at Latex 2001, Dec. 4-5, 2001, Munich, Germany. pp. 77-90.

Henderson P., "Isoprene Monomer to Synthetic Polyisoprene Latex," International Latex Conference 2000, Jul. 25-26, 2000, Akron, Ohio, US, 8 pages.

Ho C.C. and Knew M.G., "Surface characterization of chlorinated unvulcanised natural rubber latex films," International Journal of Adhesion and Adhesives, 1999, vol. 19 (5), pp. 387-398.

Kraton. Cariflex(tm) IR latex compared to natural rubber latex, Jul. 2012, 15 pages.

Kraton, Cariflex(TM) Polysioprene Latex: Pure Performance and Comfort, 2011. 2 pages.

Kraton IR Polymers: The Clear Alternative, 2002. 2 pages.

Mahmoud Abdei-Goad, et al., "Rheological Properties of 1,4-Polyisoprene over a Large Molecular Weight Range," Macromolecules, 2004, vol. 37 (21), pp. 8135-8144.

Mausser R.F., The Vanderbilt Latex Handbook, 3rd Edition, 1987, p. 109, R.T. Vanderbilt Company, Inc.,.

Natural Rubber Science and Technology, A.D. Roberts, ed., Oxford University Press, 1988, pp. 105-107.

Ngai K.L., et al., "Terminal Relaxation and Diffusion of Entangled Three-Arm Star Polymers: Temperature and Molecular Weight Dependencies," Journal of Polymer Science Part B: Polymer Physics, 1997, vol. 35 (15), pp. 2503-2510.

"Polyisoprene" Entry from Hawley's Condensed Chemical Dictionary, 14th Edition, © 2002, John Wiley & Sons, Inc. 1 page.

Product data sheet of NATSYN 2200 by GoodYear.

Tony Whelan, Polymer Technology Dictionary, 1994, Chapman and Hall, London, UK, p. 270.

Yildirim Erbil H., "Vinyl Acetate Emulsion Polymerization and Copolymerization with Acrylic Monomers," Chapter 7 Experimental Determination of Latex Properties, published in 2000 by CRC Press, 1 page.

WATER-BASED RESIN COMPOSITION AND ARTICLES MADE THEREFROM

Cross Reference to Related Applications

This application is a continuation of U.S. patent application Ser. No. 12/403,901, filed Mar. 13, 2009, which claims priority from U.S. Provisional Application No. 61/036,605, filed Mar. 14, 2008, the disclosures of which are hereby incorporated by reference in their entirety.

FIELD OF THE INVENTION

The present invention relates to a novel water-based resin composition that includes an aqueous elastomer dispersion. Further, the invention relates to a method of preparing the aqueous elastomer dispersion and articles made from the aqueous elastomer dispersion which provide substantial improvements in performance when compared to those made from conventionally prepared water-based resin compositions.

BACKGROUND OF THE INVENTION

The use of water-based resin dispersions for making articles such as a film, coating, and adhesive provides several advantages when compared to its solvent-based counterpart. In particular, water-based dispersions are environmentally-friendly, easy to formulate, control temperature, and regulate pre-maturation, and have adjustable viscosities.

However, there are also several disadvantages to using a conventional water-based resin dispersion. For example, there are limits on both the compounding of the dispersion and the resulting article. After compounding, a barrier forms between the elastomer dispersion and the remaining components such as dispersions of curing ingredients and additional polymer dispersions. During the film forming process, the remaining components must overcome this barrier by leaving the confines of their own dispersion (water, surfactant, and emulsifier), traveling through the aqueous medium of the compounding formulation, crossing the surface of the dispersion of the elastomer particle, and finally penetrating into the elastomer particles. The likelihood of this occurring is even smaller for higher molecular weight components. This obstacle also leads to a limitation on the nature of the components that may be used.

The second disadvantage is the limitations in the performance of the articles prepared from a conventional elastomer dispersion. There is limited miscibility between the elastomer and the remaining components, particularly when both have different inherent structures. This causes the elastomer and the components to remain in their bulk states and inhibits their ability to diffuse and mix in a homogenous manner. As a result, articles made from conventional elastomer dispersions have inferior properties.

The third disadvantage is the complexity of formulating conventional elastomer dispersions and a lack of flexibility in altering the formulations while attempting to improve the performance of articles made from the conventional elastomer dispersions.

Thus, there is a need to develop a new elastomer dispersion that can reduce or eliminate these disadvantages. This will result in a dramatic improvement in the performance of the resulting articles.

SUMMARY OF THE INVENTION

The invention relates to a novel aqueous elastomer dispersion, its method of preparation, and articles made from the aqueous elastomer dispersion. The aqueous elastomer dispersion of the invention includes a dispersed phase and an aqueous phase. The dispersed phase includes an elastomer such as polyisoprene and a minor amount of at least one additive. The aqueous phase includes water and other optional components dissolved in it.

The aqueous elastomer dispersion may be prepared by dissolving an elastomer and additives in a solvent mixture and then converting the resulting solution into an aqueous emulsion. The aqueous emulsion is concentrated by removing the aqueous phase material and the solvent is stripped from the concentrated emulsion to yield a dilute latex. The dilute latex that is obtained is preferably concentrated again to a desired solid content.

Articles made from the aqueous elastomer dispersion include medical gloves, condoms, probe covers, dental dams, finger cots, catheters and the like.

DETAILED DESCRIPTION OF THE INVENTION

The present invention, which relates to a novel aqueous elastomer dispersion, its method of preparation, and articles made from the aqueous elastomer dispersion formulation, overcomes the obstacles discussed above.

The following terms and definitions are provided to clarify the meaning of specific terms:

A colloidal "dispersion" is an intermediate between a true solution and a mixture, or suspension. It can also be considered an "emulsion," which consists of two liquid phases, a "dispersed phase", microscopic globs, which are distributed throughout the "dispersing phase". In oil in water dispersion (O/W), the dispersing phase is also named as aqueous phase. The emulsion of the present invention is generally referred to as a synthetic colloidal polymer, wherein the polymer may be prepared via emulsion polymerization (nitrile, polychioroprene), coordination (Ziegler-Natta) polymerization (cis-polyisoprene) or anionic polymerization (cis-polyisoprene).

"Latex" was originally referred to as a sap from a rubber tree for making rubber products. Thus, dispersions, emulsions and latex are all considered to be kinetically stable, colloidal systems and these terms are used interchangeably for water-based elastomer systems in the invention.

"Vulcanization" refers to a specific curing process of rubber that involves the addition of sulfur and is normally used in solid rubber process. It is an irreversible chemical crosslinking reaction in which polymer molecules are linked to other polymer molecules by atomic bridges composed of sulfur atoms.

"Curing" refers to either a chemical reaction that results in a higher molecular weight or a physical process that is associated with a solidified phase change. For the process of the present invention, curing and vulcanization may be used synonymously when referring to a process utilizing sulfur or sulfur donors.

A conventional "curing process" of an elastomer is a crosslinking reaction using curing ingredients including (1) curing/crosslinking agents such as elemental sulfur and/or various insoluble sulfur donors which release sulfur when heated, and/or peroxide curing agents, (2) accelerators which behave like catalysts for the reaction and may be categorized as either primary (e.g., mercaptobenzothiazole MBT and mercaptobenzothiazole disulfide MBTS) or secondary accelerators (e.g., thiuram, dithiocarbarnate and guanidine), and (3) activators such as metallic oxides and metallic salts (e.g., zinc oxide).

"Creaming" is one of several methods (centrifuging, electro-decantation and evaporation) developed for concentrating newly-made elastomer dispersions. This process can concentrate a low-solid emulsion to, for example, an above 50% solid emulsion. The creaming process depends on the difference in specific gravity between water (1.0) and the elastomer polymer (e.g. about 0.91) or buoyancy of the elastomeric polymer by gathering the particles which are surrounded by serum, near the bottom or near the top of the emulsion. When the separation is complete, the aqueous serum phase is removed, leaving the concentrated emulsion cream phase. Creaming can be accelerated by the addition of certain creaming agents such as sodium alginate, polyvinyl alcohol or cellulose derivatives.

The aqueous elastomer dispersion of the invention includes a dispersed phase and an aqueous phase. The dispersed phase includes an elastomer and a minor amount of at least one additive. The aqueous phase includes water soluble components which are used in conventional elastomer dispersion formulations, such as surfactants, pH adjusting agents and other water soluble adjuvants. The amount of water soluble components in the aqueous phase of the elastomer dispersion is typically not more than about 10%, and is preferably about 2-10% by weight of total dispersion solids.

The elastomer may be a curable aliphatic conjugated-diene including, but not limited to polyisoprene, polychloroprene, styrene-butadiene copolymers, acrylonitrile-butadiene copolymers, styrene block copolymers, and butyl rubber. The preferred elastomer of the invention is polyisoprene, which may be either natural or synthetic. Any synthetic, linear, high molecular weight polyisoprene with a molecular weight of about 100,000 to about 3,000,000 that is commercially available can be used.

The at least one additive in the dispersed phase of the aqueous elastomer dispersion may include at least one of curing ingredients, non-curing ingredients, and additional polymers, to be discussed below, with the same, similar or different chemical structures from the elastomer. The total amount of additive(s) used is about 0.5-49% by weight of total dispersion solids.

The curing ingredients may include any such ingredients found in conventional elastomer dispersion compounding formulations. For example, the curing ingredients may include, but are not limited to, sulfur/sulfur donors, accelerators (primary and secondary), and sulfur-curing (or vulcanization) activators and peroxide curing/crosslinking agents which are known to those skilled in the art. There is no limitation on the chemistry and the number of curing ingredients, but they should be capable of dissolving or dispersing in the solvent system of the elastomeric solution which is described in detail below. The chemical structure of the curing ingredients and their activity do not have to be kept intact throughout the emulsification process, but the incorporation of curing ingredient(s) should not adversely affect the desirable performance of the resulting article made by the dispersion of the present invention.

When curing using sulfur, the main curing agent preferably comprises elemental sulfur (generally believed to be in the form of S8, but not so limited). This may be used alone or in combination with a sulfur donor. A sulfurless system can also be used, but this requires a sulfur donor. Sulfur donors may include, but are not limited to thiuram polysulfides such as tetramethylthiuram disulfide and tetraethylthiuram disulfide, which also function as vulcanization accelerators, and xanthogen polysulfides such as butylxanthogen disulfide, CPB, diisopropyl xanthogen polysulfide DIXP, and diisopropyl xanthogen disulfide.

Peroxides may include, but are not limited to, dibenzoyl peroxides such as one manufactured by R.T. Vanderbilt as Varox A-75, which has a curing temperature of 120° C./20 minutes for polyisoprene latex, dicumyl peroxides such as one manufactured by Akzo Nobel as Perkadox BC-40B, which has a curing temperature of polyisoprene rubber of 120° C./20 minutes, and combinations thereof.

Accelerators may include, but are not limited to, dithiocarbamates such as zinc dimethyl dithiocarbamate (ZDMC), zinc diethyldithiocarbamate (ZDEC), zinc dibutyl dithiocarbamate (ZDBC), zinc dibenzyl dithiocarbamate (ZBEC) and zinc pentamethylene dithiocarbamate (ZPD), thiazoles such as 2-mercaptobenzothiazole (MBT), sodium 2-mercaptobenzothiazole (SMBT) and zinc 2-mercaptobenzothiazole (ZMBT), thiuram sulfides such as tetramethyl thiuram disulfide (TMTD), tetraethyl thiuram disulfide (TETD and tetrapentamethylene thiuram disulfide (TPTD), guanidines such as diphenylguanidine (DPG) and di-o-tolyguanidine (DOTG), and thioureas such as thiourea and diphenyl thiourea. One or more accelerators may be used to formulate the elastomer dispersion of the invention.

Activators may include, but are not limited to, zinc oxide, magnesium oxide and lead oxide. Zinc oxide is the most commonly used vulcanization activator. A single accelerator or a synergistic combination of accelerators may be used.

Including curing ingredients such as sulfur/sulfur donors, accelerators and/or activators in the emulsification process improves the curing mechanism and modifies the topological features of cured articles. For example, it provides manufactured articles with such qualities as a thinner film, a lower level of chemical residue, and an increased curing efficiency compared with a manufactured article made conventionally by resin dispersion containing the elastomer only and curing ingredients added as aqueous dispersions.

Most of the non-curing ingredients used in aqueous elastomer dispersion formulations of the art are solid, moisture sensitive and have a high molecular weight. This causes the resulting article made from the elastomer dispersion to have such problems as low efficiency of ingredient use, discoloration, property deterioration, and processing difficulties. These problems can be overcome with the aqueous elastomer dispersion of the invention. In a preparation of the elastomer dispersion of the invention, non-curing ingredients may be included in the formulation without a series of physiochemical processes such as aggregation, diffusion and migration (which occur with formulation of a conventional elastomer dispersion). Consequently, the performance of the resulting article, such as glove, is improved.

Any non-curing ingredients that are conventionally used in elastomer dispersion compounding formulations may be used in the aqueous elastomer dispersion of the invention. For example, the non-curing ingredients may include, but are not limited to, antioxidants, stabilizers, plasticizers, anti-ozone agents, pigments, fillers, antimicrobial agents, indicators, and additional polymers.

Suitable antioxidants that may be added to the aqueous elastomer dispersion may include, but are not limited to hindered phenols such as butylated hydroxytoluene (2,6-di-tert-butyl-4-methylphenol) and thiodiethylene bis-di-t-butyl-4-hydroxyphenyl propionate, hindered polyphenolics such as butylated reaction products of p-cresol and dicyclopentadiene, hindered phenol/hindered polyphenolics such as trimethyl-tris (di-t-butyl-4-hydroxybenzym)-benzene or octadecyl di-t-butyl-4-hydroxyphenyl propionate, amines such as a blend of 6PPD with methyl styrene and bis-alpha-dimethylbenzyl diphenyl amine, mixtures such as zinc mercaptotulumimidazole/phenolic, triazinone derivatives such as triazinone-phenol mixtures, polyaromatic amines such as poly(m-anisidine), phenolic antioxidant hydrazides such as phenolics with anhydride copolymer, phenolics such as 2,2'-methylene-bis-(4-methyl-6-t-butylphenol), cresols such as 2,4-dimethyl-6-(1-methylcyclohexyl)-p-cresol, and styrenated phenols. It is preferred that hindered polyphenolics are used.

Colloidal stabilizers including alkalis for pH adjustment, surfactants and alkaline caseinates such as sodium caseinate may also be added to the aqueous phase.

Suitable plasticizers that may be added to the aqueous elastomer dispersion may include, but are not limited to, fatty salts, mineral oils and ester plasticizers.

An antiozonant may be added to the aqueous elastomer dispersion because ozone severely damages some elastomeric articles, such as highly unsaturated polyisoprene articles. When included in the aqueous elastomer dispersion of the invention, certain high molecular weight polymers, such as paraffin wax, EPDM and hydrogenated polydiene can provide such articles with excellent ozone resistance. Other examples of antiozonants that may be used in the invention may include, but are not limited to alkyl/aryl p-phenylenediamines such as N-1, 3-dimethylbutyl-N'-phenyl-p-phenylenediamine 6PPD, organoclay-antiozonant complexes such as smectite-containing clay with alkyl-aryl-p-phenylenediamine, functionalized benzotriazoles such as N, N-disubstituted para-phenylenediamine, triazines such as tris (N-1,4-dimethylpentyl-p-phenylenediamino) 1,3,5-triazine and tris (N-alkyl-p-phenylenediamino) 1,3,5-triazine, and p-phenylenediamines such as N-isopropyl-N'-phenyl-p-phenylenediamine (IPPD). In addition, polymers including waxes such as paraffinic wax (MW=300-500), microcrystalline wax (MW=600-700) (with paraffinic wax) and low MW PE wax (MW=100-1100), polymeric antiozonants such as polymeric diphenyldiamine, and ozone inert polymers such as EPDM and brominated isobutylene/para-methylstyrene copolymer (BIMSM) may be used as antiozonants. It is preferred that waxes are used.

Suitable pigments that may be added to the aqueous elastomer dispersion may include a wide range of natural pigments such as titanium dioxide and iron oxides, and synthetic pigments.

Suitable fillers that may be added to the aqueous elastomer dispersion may include, but are not limited to, inorganic fillers such as clays, calcium carbonate, talc, and silica and organic fillers such as crosslinked polymethyl methacrylate, finely divided urethane resin particles and polyethylene microsphere.

Infection prevention can be effectively achieved when an antimicrobial agent is dispersed in the aqueous elastomer dispersion of the invention. The resulting article, such as an antimicrobial glove, is safer for use because the antimicrobial agent does not leach out to any appreciable degree (e.g. at least 95% is retained in the article after storage at room temperature and a relative humidity of 60% for three months), as it is intimately mixed/dispersed with the polyisoprene. Examples of antimicrobial agents that may be used in the polyisoprene dispersion of the invention include, but are not limited to, water-insoluble organic phenol compounds such as 5-chloro-2-(2,4-dichlorophenoxy)phenol (triclosan), 2-hydroxy-2,4,6-cycloheptatrien-1-one, o-phenylphenol, 2-benzyl-4-chlorophenol, chlorophenol, chlorothymol, and para-chloro-meta-xylenol (PCMX), inorganic silver compounds such as silver ion-zeolite particle and silver sulfadiazine, zinc compounds such as zinc pyrithione, copper compounds such as copper oxide, fatty esters such as glycerol monocaprate and glycerol monolaurate, silicone-ammonium polymers, nitrogen-containing polymers such as polyhexamethylene biguanide and hydroxybenzoate-containing polymers such as poly(methacrylate) containing hydroxybenzoate. It is preferred that organic phenol compounds are used.

Indicators may also be included in the aqueous elastomer dispersion of the invention to provide a signal of status change of the latex article, for example, when a glove is breached. Various indicators are used based on their physical and chemical properties and function by different mechanisms. For example, the moisture indicators may include, but are not limited to, inorganic salts such as cobalt chloride, metal ozonide and ozonide ester, colorants such as triarylmethane, azo dye and alphazurine, phthalein dyes such as thymolsulfonephthalein and phenolphthalein, organic salts such as dyes (phenolphthalein, thymol blue, m-cresol purple) along with transition metals and solvatochromic dyes such as betaine. The microbe indicators may include, but are not limited to, solvatochromic dyes such as betaine/Reichardt's dye, zwitterion/merocyanine and pyridinium iodide, acid pH dyes such as bromcresol purple and phthalein, and anthocyanin dyes. The blood indicators may include, but are not limited to, dye intermediates (weak bases) such as O-tolidine OTO and O-dianisidine (3, 3'-dimethoxybenzidine), acid-base indicators such as phenolphthalein, and chemiluminescents such as 5-amino-2, 3-dihydro-1, 4-phthalazinedione (Luminol). Organic salts, solvatochromic dyes and acid-base indicators are preferred.

An additional polymer(s) may be used in the dispersed phase of the aqueous elastomer dispersion. Such polymers are preferably selected such that when the additional polymer(s) is/are dissolved in the solvent system, at least part of the polymeric molecule is miscible with the elastomer. The differences between the elastomer and an additional polymer may include chemical composition, chain configuration, polymer conformation, molecular weight/molecular weight distribution and combinations thereof. The additional polymer(s) may be involved in the curing process or not, but its existence should not compromise final performance of the manufactured article. Whether or not polyisoprene is used as the curable aliphatic conjugated-diene elastomer, the additional polymer(s) may include, but is/are not limited to, liquid polyisoprene, lower molecular weight polyisoprene, isomers or analogue of polyisoprene, a terminal-functionalized derivative of polyisoprene, a copolymer of polyisoprene, polychloroprene, a styrene-butadiene copolymer, acrylonitrile-butadiene copolymers, styrene block copolymers, butyl rubber, and modified forms of these polymers. The aqueous elastomer dispersion of the invention may have a range of 0.5 to 49% of the additional polymer in the dispersed phase.

A flowable liquid polyisoprene with a molecular weight of about 25,000-50,000 may be used as a processing aid in an elastomer formulation and can be co-dispersed with conventional high molecular weight polyisoprene, as described in the present invention. In addition to its application as barrier sealing, adhesive and elastomeric coating (See U.S. Pat. No. 7,335,807), it can also improve film forming and provide thin films such as gloves when included in the polyisoprene dispersion of the invention. Examples of non-limiting liquid polyisoprene materials may include, but are not limited to depolymerized rubber DPR and synthetic liquid polyisoprene such as Claprene L-IR-30.

Lower molecular weight polyisoprenes function similarly to reactive plasticizers so they can modulate the curing process. These low molecular weight polyisoprenes can make the article thinner, softer and increase tactile sensitivity. Typically, the molecular weight of such polymers is in the range of about 20,000-100,000. They may include but are not limited to Lycopene, Isolene, Synotex 800, and Natsyn 2210.

Structural isomers include cyclized polyisoprene/3,4-polyisoprene, trans-1, 4-polyisoprene, and branched polyisoprene/star-shaped elastomers. Cyclized polyisoprene/3,4-polyisoprene, such as Synotex 800 and Isogrip, can improve the tear resistance, wet grip, tensile strength and lower modulus for manufactured articles due to its cyclized structure. Trans-1, 4-polyisoprene, for example TP-301, provides a different chain configuration for film stability against film aging and dimensional changes. Branched and star-shaped polyisoprene, such as Shellvis 250, provides an improved fit for articles, such as gloves, and a decreased tackiness due to a unique time-temperature relaxation property of its non-linear structure (See Terminal relaxation and diffusion of entangled three-arm star polymers: Temperature and molecular weight dependencies, Journal of Polymer Science Part B: Polymer Physics 35 (15) 2503-2510 1997, incorporated herein by reference). Their effectiveness depends on the branching index and a value greater than 1 is preferred (See Rheological Properties of 1, 4-Polyisoprene over a Large Molecular Weight Range, Macromolecules, 37 (21), 8135-8144, 2004, incorporated herein by reference).

An example of an analogue elastomer is a hydrogenated polyisoprene available as LIR 920. It can provide a manufactured article, such as a glove, with a low modulus, low aging degradation, good fit and recovery upon stretch. This is due to its soft aliphatic chain to provide lubrication in the mobility of the polymeric chain when forming a film.

Terminal-functionalized derivatives of the polyisoprene may include, but are not limited to acrylated polyisoprene, carboxylated polyisoprene, epoxidized polyisoprene, sulfonated polyisoprene, and hydroxylated polyisoprene. Acrylated polyisoprene may include but are not limited to HEMA- and acrylic acid-modified polyisoprene. They can provide a manufactured article, such as a glove, with an improved chlorination process by way of decreasing the overall chlorination level. Carboxylated polyisoprene can provide improved stability to the aqueous elastomer dispersion of the invention. Additionally, they provide the manufactured article with improved film forming properties. Its hydrophilic nature lends itself to absorbing moisture and providing the manufactured article with breathability. Sulfonated polyisoprene provides a manufactured article with such properties as antistatic, antimicrobial, improved wet donning, and anti-coagulation properties.

Copolymers of polyisoprene that may be used in the dispersed phase of the aqueous elastomer dispersion may include, but are not limited to, di-block and tri-block copolymers. Examples of di-block copolymers may include polyisoprene-b-polybutadiene, polystyrene-b-polyisoprene, polyisoprene-b-polymethyl methacrylate, and polyisoprene-b-polyacrylic acid. Examples of tri-block copolymers may include styrene-isoprene-styrene (SIS) and styrene-b-(ethylene-co-butylene)-b-styrene (SEBS). The copolymers may be dissolved in a solvent such as toluene before being incorporated in the dispersed phase. Such copolymers provide the resulting manufactured article with an improved barrier.

A generalized formulation for the vulcanization of water-based latex and the addition of various additives such as the one shown in Table 1 below may be used to prepare the aqueous elastomer dispersion of the invention. With the exception of the stabilizers, all of the ingredients in the formulation of Table 1 are in the form of aqueous dispersions (for solids) or aqueous emulsions (for liquids).

TABLE 1

| Ingredient | Parts by dry weight rubber (phr) | |
|---|---|---|
| | Range | Preferred |
| Rubber latex | 100 | 100 |
| Sulfur and/or Sulfur donors | 0.1-5 | 0.5-2 |
| Accelerators | 0.1-10 | 0.5-5 |
| Activators | 0.1-5 | 0.5-2 |
| Antioxidants | 0.1-5 | 0.5-2 |
| Stabilizers | as required | |
| Plasticizers | 0-15 | 0-5 |
| Antiozonants | 0-5 | 0.5-2 |
| Pigments | 0-5 | 0-2 |
| Fillers | 0-30 | 0-10 |
| Antimicrobial Agents | 0-5 | 0-1 |
| Indicators | 0-5 | 0-1 |
| Additional Polymers | 0-49 | 0.5-25 |

The formulation in Table 1 may be used for natural rubber latex or in currently available commercial synthetic rubber latexes. Generally, using additives as described above in various combinations or concentrations provides superior properties that are not attainable with currently available synthetic latexes. The formulation of Table 1 may be modified to make the aqueous elastomer dispersion of the invention. In particular, for certain applications, a lower concentration of the additives may be desired to provide better or similar properties.

In one embodiment of the invention, the crosslinking agent, preferably sulfur, is not added into the latex as this may cause premature excessive crosslinking of the rubber in the latex particles. In other embodiments of the invention, the crosslinking agent, preferably sulfur and/or sulfur donors, is/are added as an aqueous dispersion during compounding of the aqueous latex before use. Similarly, since the vulcanization activator, preferably zinc oxide, is inorganic, it does not dissolve in an organic solvent and cannot be incorporated into the latex dispersion. Thus, the vulcanization activator may be added as an aqueous dispersion during compounding of the aqueous latex before use.

Figure 1:
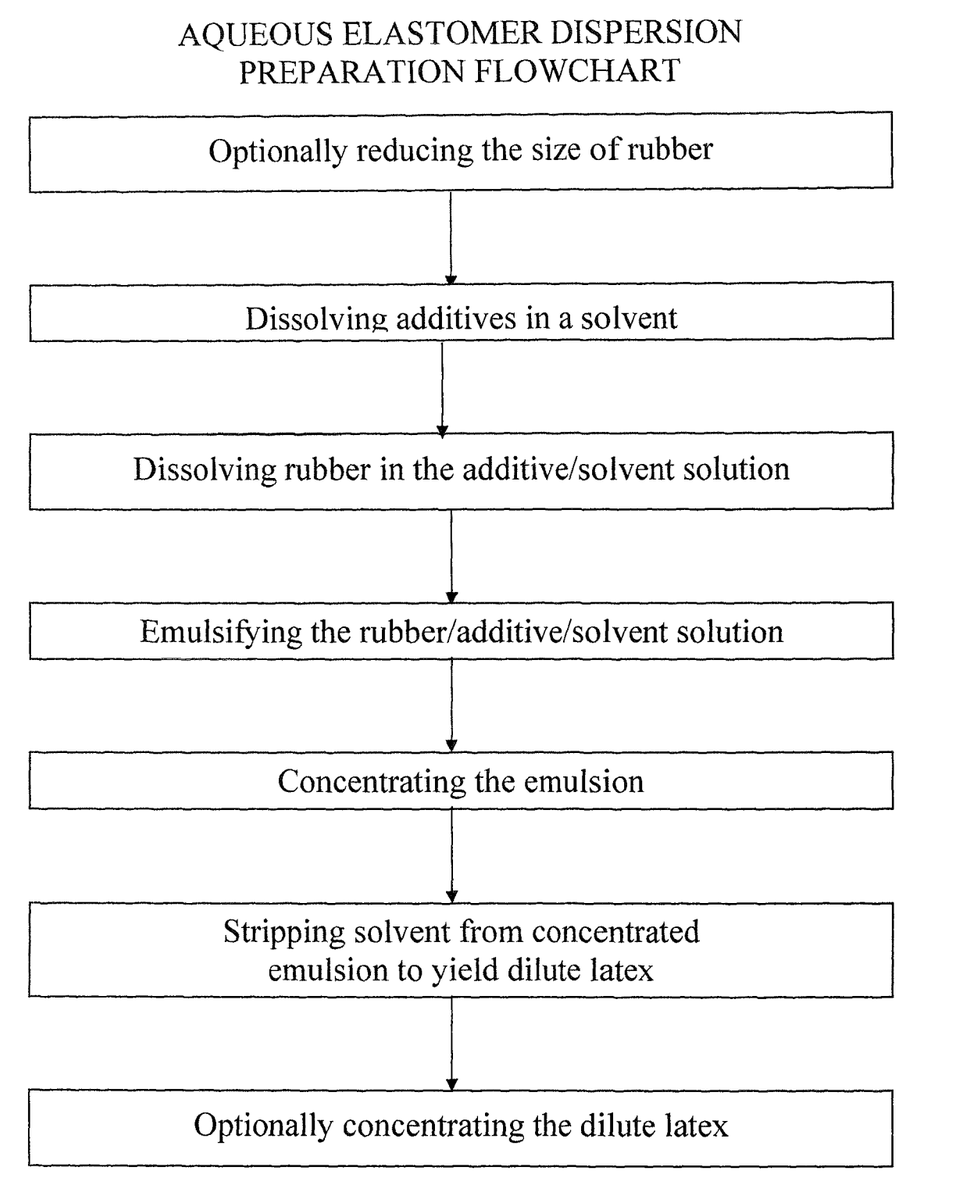
FIG. 1 is a flowchart illustrating a preferred method for preparing the aqueous elastomer dispersion of the invention.

A method for preparing the aqueous elastomer dispersion from an elastomer such as dry rubber, with additives in the dispersed phase according to the invention is illustrated in the flowchart of FIG. 1. The method is described as follows and in the Examples. The basic steps outlined in FIG. 1 are not meant to limit the scope of the invention and may be repeated or performed in different orders to prepare various types of latexes according to the invention.

As shown in FIG. 1, the starting elastomer, such as rubber, is optionally processed to reduce its size so that it can easily dissolve in a solvent. A preferred range of sizes for the rubber particles is about 1-3 mm.

Then, a solution of the elastomer and a minor amount of at least one additive in a solvent system is prepared. The solvent system provides a medium for homogenously mixing the elastomer and the additional additive prior to emulsification. The additives that are to be included in the dispersed phase are dissolved in a solvent or a mixture of solvents. The solvents for the additives are not limited, but should be mixable with solvents that will be used to dissolve the elastomer. Suitable solvents for additives may include but are not limited to dichloromethane (DCM), chloroform, carbon tetrachloride, acetone, and alcohols.

The concentrations of the accelerators added may be based on the formulation for vulcanizing the rubber provided in Table 1 and are optimized to provide desired properties of the vulcanized rubber. A sufficient amount of solvent is added to ensure that the additives are still soluble with the solvent for the rubber. The additives may be first dissolved in the additive solvent and then combined with the rubber solvent or may be dissolved in a mixture of the additive solvent and the rubber solvent.

The rubber is dissolved in the solution containing the solvent(s) and the additives. Alternatively, the rubber may first be dissolved in its own solvent before adding it to the mixture of additives and their solvents. Suitable solvents for elastomers may include but are not limited to, pentane, hexane, heptane, pentene, toluene, cyclopentane, and cyclohexane. The solvents for the elastomers may be organic liquids that have a boiling point of less than 100° C., and preferably less than 70° C., preferably at atmospheric pressure or if necessary, with the application of a partial vacuum. The solvent system may include a single solvent or a solvent mixture including a co-solvent.

The concentration of the rubber in the solvent is governed by the solubility of the rubber in the solvent. It is preferred to dissolve as much rubber as possible in the solution. However, its concentration should preferably be no more than 80%, more preferably no more than 60%, and most preferably no more than 50% of the maximum limit of solubility because at maximum solubility, the solution may be too viscous for it to be mixed with the emulsifier solution and to be broken down into small droplets to form an emulsion.

The vessel containing the rubber/additive/solvent mixture may be closed to minimize evaporation and stirred until the rubber is completely dissolved. The temperature of the solvent is preferably maintained at about 25-35° C., more preferably at about 28-30° C.

The resulting solution containing the rubber, additives, and solvent is then converted into an aqueous emulsion by a process known to those of skill in the art, such as those described in U.S. Pat. Nos. 3,250,737, 3,285,869, 3,971,746, 3,968,067 and 6,329,444, hereby incorporated by reference. The process may include emulsifying the polymer solution using an emulsifier composition, removing the solvent or liquefying the polymer solution, and combining it with an aqueous medium under conditions that are favorable to stabilizing the emulsion. Alternatively, the water-based dispersion may be formed by following the steps of emulsifying the polymer solution using an emulsifier composition in an aqueous medium and then removing the solvent, as outlined in FIG. 1.

In general, the emulsifier should be capable of forming a stable emulsion that can withstand the heat during evaporation of the solvent and the subsequently formed latex could be destabilized by alkaline earth metal ions, such as calcium ions (e.g., from calcium nitrate used for coagulant dipping to make gloves). Emulsifier agents may include, but are not limited to, sodium dodecyl sulfate, sodium dodecyl benzene sulfonate, and carboxylic acid soaps such as caprylic acid soap, capric acid soap, lauric acid soap, oleic acid soap and rosin acid soap or mixture of these. Suitable emulsifiers should preferably have low foaming propensities so that excessive foaming does not occur during the various process steps of isolating polyisoprene latex concentrate. The weight of the emulsifier solution is typically about 1-5 wt/vol %, preferably 1-3 wt/vol %, based on the volume of the solvent. For example, an emulsifier solution of 2% Nekal BX dry (BASF, 68% sodium alkyl naphthalene sulphonate) in water adjusted to a pH of 10.5-11.0 with, e.g., 3% potassium hydroxide solution may be used.

The latex emulsion is then prepared by pouring the rubber/additive/solvent solution into the emulsifier solution which is preferably stirred, e.g., with a laboratory Silverson L4RT mixer fitted with a Square Hole High Shear Screen™ at about 3500-4500 rpm. The mixer speed is varied until the foams that are formed break. In an exemplified process, after stirring for about 5 minutes at 3500-4500 rpm, the mixer speed may be increased to about 5000-7000 rpm and stirred for about 10 minutes. The mixer speed may then be reduced to about 500-1000 rpm and stirred for about 5 minutes during which time the foams that are formed break. If excessive foaming occurs after some time of high speed shearing (5000-7000 rpm), the mixing speed may be reduced to about 1000 rpm and stirring continues until the foams break. Then, the mixing speed may be increased back to 5000-7000 rpm and mixing continues until the total time of shearing at this speed is about 10 minutes.

The stirring speed is not limited to the ranges mentioned above, but is chosen so that the final mean diameter of the elastomer particles is similar to those of commercial latex products. For example, commercial polyisoprene latex products have a volume mean diameter of about 1 micrometer. Typically, a volume mean particle diameter of about 0.5 to 1.5 micrometers is desirable. Higher stirring speeds result in a final elastomer latex particle having a smaller particle diameter. The range of speeds can be broadened, depending on the desired application. For example, about 5000 rpm-8000 rpm should give the desired final particle size depending on the total time of high shear mixing. A slightly shorter time is required when the higher speed is used, and a lower speed will result in larger particle size.

Next, the aqueous emulsion is concentrated, whereby at least 20%, preferably at least 30%, and more preferably at least 40% of the aqueous phase is removed resulting in a first emulsion concentrate. The emulsion is preferably concentrated using a creaming agent to increase the rate of separation. The creaming agent may include, but is not limited to sodium alginate, ammonium alginate, methyl cellulose, locust bean gum, gum tragacanth, and carrageenin.

The emulsion containing the creaming agent is stirred at a rate of about 1500 rpm for 5 minutes, for example. The mixture may then be filtered through a muslin cloth and poured into a separatory funnel. After leaving the mixture in the separatory funnel for about 16-20 hours, the emulsion separates into two layers. The upper layer includes a concentrated emulsion and the lower aqueous layer includes water and possibly a small amount of emulsion, which is drained off.

Other ways to concentrate the emulsion include using a continuous centrifugal separator (for example, made by Alpha Laval, Westphalia or Sharples), evaporation using a thin film evaporator such as Luwa thin-layer evaporator, or ultrafiltration using membranes. On an industrial scale, the emulsion may be kept in a tall cylindrical tank and at an appropriate time, the lower layer of skim may be drained out leaving an upper layer of concentrated emulsion for further processing.

Once the aqueous layer of the concentrated emulsion is removed, at least 90%, preferably at least 95%, more preferably at least 98%, and most preferably at least 99% of the solvents are stripped from the concentrated emulsion to yield a dilute latex. The solvents may be stripped from the concentrated emulsion by, e.g., heating in a laboratory rotary evaporator, such as a Buchi rotary evaporator in which an evaporating flask is partially immersed in a water bath at a temperature of about 50-55° C. The evaporating flask may be rotated at about 150 to 200 rpm so that a fresh thin film of the emulsion is continuously formed thereby increasing the surface area for evaporation to occur.

The solvent vapor may be condensed and recovered by circulating ethylene glycol at a temperature of about −15 to −25° C. through the cooling coil of the evaporator and also by immersing the receiving flask of the evaporator in a bath of ethylene glycol at the above temperature.

Typically, a temperature of about 10-15° C. above the boiling point of the solvents evaporates off the solvents fairly rapidly. However, to evaporate off traces of residual solvent at the end of the evaporation process, the solvents may be heated to a higher temperature of about 20-25° C. above their boiling points. The temperature range can be broadened. For example, if the boiling point of the solvent is high, e.g. about 60-100° C. or greater than 100° C., then it would be desirable to apply a partial vacuum to the emulsion so that the boiling point of the solvent is reduced to less than about 60° C.

As an alternative to using a rotary evaporator to remove the solvent, any suitable device including a thin film evaporator such as a Luwa thin-layer evaporator, for example, may be used. On an industrial scale, a large scale rotary evaporator may be used.

After stripping off the solvent, the emulsion containing latex may be concentrated again to remove any remaining aqueous components by creaming, e.g., using sodium alginate. For example, about 0.1% sodium alginate (as a 2% aqueous solution) based on the volume of the emulsion may be added to the emulsion and mixed well by stirring. The mixture may then be transferred into a separatory funnel and left overnight for about 16-18 hours during which time the mixture separates into two layers. The upper layer contains concentrated latex and the lower layer typically contains a slightly turbid aqueous solution and possibly some latex. The lower aqueous layer is drained off and a concentrated latex is obtained. Preferably, in this second concentration step, the total solids content of the dilute latex is increased by at least three times, preferably at least four times, and more preferably at least five times. For example, the total solids content may increase to about 45-65%.

The concentrated latex may be kept in a separatory funnel for further separation. If this is desired, after a certain amount of time, the lower and predominantly aqueous layer may be drained off again. The latex may then be filtered through a muslin cloth. The total solids content obtainable from this process is preferably about 40% to about 70% by weight, depending on how long the latex is left to separate. Taking into account transportation costs, a higher total solids content of latex is generally preferred since transporting latex with higher total solids content means transporting more rubber and less water.

For making gloves, the solids content of compounded latex (i.e. after vulcanizing ingredients and other additives have been added to the latex) is about 25% to 40% depending on the thickness of the gloves required. Typically, gloves with a higher thickness require higher total solids content.

After the latex is concentrated to the desired solids content, the pH of the obtained latex may be adjusted, e.g., with an about 5% potassium hydroxide solution. The pH may be adjusted based on the intended application. For example, the pH range of polyisoprene latex for making gloves is about 10 to 11.

A method for preparing a polyisoprene latex according to the steps of FIG. 1 and the description above will be described in detail below in Example 1.

Example 1—Polyisoprene Latex with Additives Wingstay L, ZDEC and DPG

In this example, the additives Wingstay L, an antioxidant (obtained from Goodyear), and zinc diethyl dithiocarbamate (ZDEC) and diphenyl guanidine (DPG), vulcanization accelerators (both obtained from Flexsys), are first dissolved in solvents. The solutions are prepared by dissolving 0.4 g Wingstay L in 60 mL DCM, dissolving 0.2 g DPG in 10 mL DCM and dissolving 0.1 g ZDEC in 10 mL DCM and then adding these into 600 mL of pentane (obtained from Merck) in a 1 liter beaker.

20 g of polyisoprene rubber (Kraton IR) is cut into small pieces and slowly added into a beaker that is continuously stirred and contains the additive solution which includes 600 mL pentane and 80 mL DCM solvent that contains predissolved 2 phr Wingstay L, 1 phr DPG and 0.5 phr ZDEC. The concentration in Example 1 is about 2.9 weight polyisoprene/volume solvent. A higher concentration of about 6% weight/volume should be feasible.

The beaker is tightly covered, for example, with a polyethylene sheet to minimize evaporation and the rubber/additive/solvent mixture is stirred until the rubber is completely dissolved. The temperature of the solvent is maintained at about 25-32° C., more preferably about 28-30° C.

The rubber/additive/solvent mixture is converted to an aqueous emulsion using a suitable emulsifier and a high shear mixer. An emulsifier solution of 2% Nekal BX dry (BASF, 68% sodium alkyl naphthalene sulphonate) is prepared be dissolving 18 g Nekal BX dry in 900 mL water and adjusting the pH to 10.5-11.0 with, e.g., 3% potassium hydroxide solution. The polyisoprene latex emulsion is then prepared by slowly pouring the rubber/additive/solvent solution into the emulsifier solution which is stirred, e.g., with a laboratory Silverson L4RT mixer fitted with a Square Hole High Shear Screen™ at about 3500-4500 rpm.

After stirring for about 5 minutes at this speed, the mixer speed is increased to about 6000-7000 rpm and stirred for about 10 minutes. The mixer speed is then reduced to about 500-1000 rpm and stirred for about 5 minutes during which time the foams that are formed break. Then, the mixing speed may be increased back to 6000-7000 rpm and mixing continues until the total time of shearing at this speed is about 10 minutes.

The emulsion is concentrated by adding 0.45 g sodium alginate dissolved in 25 mL water into it and stirring at about 1500 rpm for 5 minutes. The mixture is filtered through a muslin cloth and is then poured into a separatory funnel. After leaving the mixture in the separatory funnel for about 16-20 hours, the emulsion separates into 2 layers. The upper layer includes a concentrated emulsion (about 700-750 mL) and the lower aqueous layer includes water and possibly a small amount of emulsion, which is drained off.

The solvents (in this example, pentane and DCM) are then stripped from the concentrated emulsion by, e.g., heating in a laboratory rotary evaporator, such as a Buchi rotary evaporator in which an evaporating flask is partially immersed in a water bath at a temperature of about 50-55° C. The evaporating flask is rotated at about 150 to 200 rpm so that a fresh thin film of the emulsion is continuously formed thereby increasing the surface area for evaporation to occur.

After stripping off the solvent, the emulsion containing polyisoprene latex is again concentrated by creaming, e.g., using sodium alginate. About 0.1% sodium alginate (as a 2% aqueous solution) based on the volume of the emulsion is added to the emulsion and mixed well by stirring. The mixture is then transferred into a separatory funnel and left overnight for about 16-18 hours during which time the mixture separated into two layers. The upper layer contains concentrated latex and the lower layer contains a slightly turbid aqueous solution with a little latex. The lower aqueous layer is drained off and a concentrated latex is obtained.

The concentrated latex is kept in the separatory funnel for further separation. After about 7 days, the lower and predominantly aqueous layer is drained off again. The latex is filtered through a muslin cloth, and its pH is adjusted to 10.6, e.g., with a 5% potassium hydroxide solution.

Another example of preparing a polyisoprene latex according to the steps of FIG. 1 will be described in detail below in Example 2.

Example 2—Polyisoprene Latex with Additives Wingstay L, ZDEC, DPG and MBT

A solution containing four additives is prepared by dissolving 0.44 g Wingstay L (obtained from Goodyear, 2 phr) in 60 mL DCM (obtained from Merck), dissolving 0.22 g DPG (obtained from Flexsys, 1 phr) in 20 mL DCM, dissolving 0.11 g ZDEC (obtained from Flexsys, 0.5 phr) in 20 mL DCM, dissolving 0.11 g MBT (obtained from Merck, 0.5 phr) in 50 mL acetone (obtained from Merck) and then adding the solutions one at a time to 600 mL pentane (obtained from Merck, solvent for polyisoprene) in a 1 liter beaker.

22 g of polyisoprene rubber (Kraton IR) is cut into small pieces and slowly added into the continuously stirred solvent mixture containing the four predissolved additives described above. The beaker is tightly covered with a piece of polyethylene sheet to minimize evaporation and the rubber/additives/pentane/DCM/acetone mixture is stirred until the rubber is completely dissolved. The temperature of the solvent mixture is preferably maintained at about 25-32° C., more preferably about 28-30° C.

An emulsifier solution of 2% Nekal BX dry (BASF, 68% sodium alkyl napthalene sulphonate) is prepared be dissolving 18 g of Nekal BX dry in 900 mL water and adjusting the pH to 10.5-11.0 with, e.g., a 3% potassium hydroxide solution.

A polyisoprene rubber/additives/solvent emulsion is then prepared by slowly pouring the rubber/additive/solvent solution into the emulsifier solution which is stirred, e.g., with a laboratory Silverson L4RT mixer fitted with a Square Hole High Shear Screen™ at about 4000-4500 rpm. After stirring for about 5 minutes at this speed, the mixer speed is increased to about 5800-6000 rpm and stirring continues for about 10 minutes. The mixer speed is then reduced to about 500-1000 rpm and stirring continues for about 5 minutes during which time the foams that are formed breaks. After the foams break, the mixing speed is increased back to 5800-6000 rpm and mixing continues at this speed for about 10 minutes.

The emulsion is concentrated by adding 0.5 g of sodium alginate (obtained from Kimitsu Chemical Industries, Japan) dissolved in 25 mL of water and stirring at about 1500 rpm for 5 minutes. The mixture is filtered through a muslin cloth and then poured into a separatory funnel. After leaving the mixture for about 16-20 hours, the emulsion separates into 2 layers. An upper layer is a concentrated emulsion (about 720 mL) and a lower aqueous layer may contain a small amount of emulsion, which is drained off.

The solvents (in this case pentane/DCM/acetone) are stripped off from the concentrated emulsion by, e.g., heat evaporation in a Buchi rotary evaporator by heating it in an evaporating flask partially immersed in a water bath at a temperature of about 50-55° C. The evaporating flask is rotated at about 150 to 180 rpm so that a fresh thin film of the emulsion is continuously formed, thereby increasing the surface area for evaporation to occur. When the evaporation slows down (after about 2 hours), the temperature of the heating water may be increased to 60-65° C. to complete the evaporation (about 3 hours). The total evaporation time is typically about 5 hours.

After stripping off the solvent, the emulsion (which is polyisoprene latex) is concentrated again by creaming, e.g., using sodium alginate. About 0.15% sodium alginate (as a 2% aqueous solution) based on the weight of the emulsion is added to the emulsion and mixed well by stirring. The mixture is then transferred into a separatory funnel and left for 11 days whereby the mixture separated into two layers. An upper layer contains concentrated latex and a lower layer contains a slightly turbid aqueous solution, potentially with a small amount of latex. The lower aqueous layer is drained off and a concentrated latex is obtained. The latex is filtered through a muslin cloth and its pH adjusted to 10.9, e.g., with 5% potassium hydroxide solution.

The aqueous elastomer dispersions of the invention, prepared for example as described in Examples 1 and 2, exhibit properties such as solid content, particle size, and pH comparable to conventional elastomer dispersions that are commercially available. To demonstrate this feature, samples of the polyisoprene latex with additives Wingstay L, DPG and ZDEC, prepared in accordance with Examples 1 and 2, were tested and compared with two different samples of the widely available Kraton® IR401 PI latex products. The data summarized in Table 2 below indicate that the properties of the aqueous polyisoprene latex of Examples 1 and 2, such as volume mean particle diameter, solids content and pH, are comparable to the Kraton polyisoprene product.

TABLE 2

| Properties of Latex | Aqueous PI Latex, Example 1 | Aqueous PI Latex, Example 2 | Kraton IR401 Lot B1070119 | Kraton IR401 Lot B1070629 |
|---|---|---|---|---|
| Volume Mean Particle Diameter (µm) | 0.45 | 0.49 | 0.94 | 1.04 |
| Total Solids Content (%) | 51.6 | 52.97 | 64.8 | 65.6 |
| pH | 10.6 | 10.9 | 10.7 | 10.7 |

Note:
Particle size measured using Mastersizer S from Malvern Instruments Ltd.

Additional examples of preparing polyisoprene latex according to the steps of FIG. 1 described above but having increased concentrations of accelerators compared to those of Examples 1 and 2 are described in detail below in Examples 3-5. A latex from Example Control, prepared by a different method, is also tested for comparison with the latexes of Examples 3-5.

Examples 3-5 and Control—Polyisoprene Latex with Varying Amounts of Additives Wingstay L, ZDEC, DPG and ZMBT In Examples 3-5, varying amounts of Wingstay L, ZDEC, and DPG, as shown in Table 3 below, are incorporated with polyisoprene latex into a single dispersion following the method described above in reference to FIG. 1. Example Control has the same formulation as Example 3, as shown in Table 3, but is not prepared according to the methods of the present invention. Instead, Example Control is prepared according to the method described in Example 1 of U.S. Pat. No. 6,828,387 (see col. 7, line 45 to col. 8, line 67). In U.S. Pat. No. 6,828,387, each of the accelerators was formulated into a separate dispersion and was added individually to a solution containing latex in water. In Example Control, accelerators ZDEC, DPG, and ZMBT and Wingstay L that were already in dispersion form were added to latex in an aqueous solution and were then mixed together.

The latex particle sizes for Examples 3-5 were increased from the values given in Example 1 and 2 by stirring the emulsions at a lower speed. For Examples 3 and 4, the high shear stirring speed was 5000 rpm+/−100 rpm for 10 minutes instead of 5900 rpm+/−100 rpm for 10 minutes. For Example 5, the stirring speed was 5500 rpm+1-100 rpm for 10 minutes. The particle sizes for Examples 3-5 are given in Table 3 below.

About 25 g of the latex from each of Examples 3-5 and Control was weighed in a beaker and stirred with a magnet. Further, S, ZnO, ZMBT were added as aqueous dispersions and sodium caseinate was added as an aqueous solution to each latex in amounts shown in Table 3 below. For Control, Wingstay L, ZDEC and DPG were also added as dispersions. Water was added to dilute the compounded latex to about 45% total solids content and the pH of the compounded latex was adjusted to about 10.5 with a dilute potassium hydroxide solution. Each latex mixture was then filtered through a muslin cloth. The mixtures were stirred continuously for about 18 hours at an ambient temperature of about 28° C.

Latex films were prepared by casting about 6-8 g of latex on leveled glass plates having an enclosed area of about 60 mm by 100 mm. The latex was left to dry for about 24 to 48 hours. An anti-tack agent such as calcium carbonate or starch powder was applied to the dried film and the films were stripped off the glass plates. The films were then leached in water at 70° C. for 1 hour and allowed to dry in the air for 30 minutes. The films were then cured in a hot air oven at 135° C. for about 20 minutes. Dumbbell specimens of the cured films were cut for physical testing using ASTM Die D and tested according to the ASTM D412-98a test method. The results of tests of various physical properties are shown below in Table 3.

TABLE 3

|  | Example | | | |
| --- | --- | --- | --- | --- |
|  | 3 | 4 | 5 | Control |
| Ingredients (phr) | | | | |
| Wingstay L | 2.0 | 2.0 | 2.0 | 2.0 |
| ZDEC | 0.5 | 0.75 | 0.75 | 0.5 |
| DPG | 1.0 | 1.0 | 1.0 | 1.0 |
| Sodium caseinate | 0.75 | 0.75 | 0.75 | 0.75 |
| S | 1.25 | 1.25 | 1.25 | 1.25 |
| ZnO | 0.5 | 0.5 | 0.5 | 0.5 |
| ZMBT | 0.5 | 0.5 | 0.69 | 0.5 |
| Tested Properties | | | | |
| Tensile strength (MPa) | — | 9.4 | 18.0 | 21.2 |
| Stress at 500% Elongation (MPa) |  | 0.7 | 1.3 | 1.7 |
| Ultimate Elongation (%) |  | 1210 | 1080 | 1022 |
| Mean Volume Diameter (μm) | 0.75 | 0.68 | 0.64 | N/A |

The cured film of Example 3 was soft and sticky and could not be tested. As shown in Table 3, increasing the amount of ZDEC incorporated into the latex particles from 0.5 phr in Example 3 to 0.75 phr in Example 4 gave a cured film with a tensile strength of 9.4 MPa. The film of Example Control exhibited higher tensile strengths than that of Example 4.

Increasing the amount of ZDEC incorporated into the latex particles from 0.5 phr to 0.75 phr and the amount of ZMBT during compounding from 0.5 phr to 0.69 phr in Example 5 resulted in cured films with physical properties comparable to that demonstrated by Example Control, which was prepared using the known method described in Example 1 of U.S. Pat. No. 6,828,387. Overall, the results in Table 3 indicate that the novel PI latex prepared according to the present invention may provide good physical properties such as tensile strength. ASTM D3577-06 Type II classification standard for surgical gloves requires a minimum tensile strength of 17 MPa, a maximum stress at 500% elongation of 7.0 MPa, and a minimum ultimate elongation of 650%.

Another approach is to select accelerators that have low solubility in the aqueous phase, such as those having a longer hydrocarbon chain or a higher molecular weight. Examples of such accelerators may include, but are not limited to, zinc dibenzyl dithiocarbamate, zinc dinonyl dithiocarbamate, zinc di-isononyl dithiocarbamate, and zinc N-dodecyl-N-isopropyl dithiocarbamate. Such accelerators have higher solubility in the rubber phase and lower solubility in the aqueous phase.

In U.S. Pat. No. 6,828,387, the amounts of ZDEC, ZMBT and DPG added to the mixture were in the range of about 0.50 to 1.00 phr. In the present invention, the amounts of each of these accelerators may be higher. In particular, the amount of ZDEC may be in the range of about 0.2 phr to about 7.0 phr, preferably about 0.5 phr to about 3.0 phr, the amount of DPG may be in the range of about 0.2 to 10.0 phr, preferably about 0.5 phr to about 4.0 phr, and the amount of ZMBT may be in the range of about 0.2 phr to about 10.0 phr, preferably about 0.5 phr to about 4.0 phr.

In the latex made according to the process of the present invention, the additives are already incorporated into the elastomer before compounding. This is because the additives are dissolved in a suitable solvent, combined with the polyisoprene solution, and then made into a dispersion. This method differs from other known methods, such as the method recited in Example 1 of U.S. Pat. No. 6,828,387 and in Example Control above, where separate dispersions/emulsions of each of the components (elastomer and additives) are obtained from suppliers and are then combined together.

Dispersions/emulsions are, by nature, thermodynamically unstable systems, and in a multiple formulation process, there are many challenges to obtaining a desirable uniform mixture. In particular, it is difficult to match the stabilization of each of the individual dispersions/emulsion systems, and because of this, a broad particle size distribution often results. The method of the present invention may overcome this disadvantage.

Further, the process for converting the solution containing these three additives into latex is the same as that for converting a solution of polyisoprene without the additives into latex. Thus, this method does not require extra energy. This process allows for a savings in energy, equipment cost, materials (a lower amount of surfactant is needed to stabilize the dispersion), and labor required for dispersing these three ingredients when compared to the method recited in Example 1 of U.S. Pat. No. 6,828,387.

In addition to Wingstay L, ZDEC and DPG, copolymers of polyisoprene may be incorporated into the dispersed phase of the polyisoprene latex by the method described below in Examples 6 and 7, which follow the method outlined in FIG. 1.

Example 6—Polyisoprene Latex with Additives Wingstay L, ZDEC, DPG and SIS (Quintac 3421)

The copolymer of polyisoprene used in this example was a styrene-isoprene-styrene (SIS) diblock copolymer obtained from Zeon Chemicals under the trade name Quintac 3421. Quintac 3421 has a styrene content of 14%. A solution was prepared by dissolving 0.44 g Wingstay L (obtained from Goodyear, 2 phr) in 60 mL DCM (obtained from Merck), dissolving 0.22 g DPG (obtained from Flexsys, 1 phr) in 20 mL DCM, dissolving 0.165 g ZDEC (obtained from Flexsys, 0.75 phr) in 20 mL DCM, and dissolving 3.3 g Quintac 3421 (obtained from Zeon Chemicals, 15 phr) in 30 mL toluene (obtained from Merck). The solutions were then added one at a time to 600 mL pentane (obtained from Merck, solvent for polyisoprene) in a 1 liter beaker. The solution of Quintac 3421 in toluene was very viscous and 3 mL of toluene was used for rinsing the residue sticking on the glass container.

22 g of polyisoprene rubber (Kraton IR) was cut into small pieces and slowly added into the continuously stirred solvent mixture containing the four predissolved additives described above. The beaker was tightly covered with a piece of polyethylene sheet and tied with a rubber band to minimize evaporation and the rubber/additives/pentane/DCM/toluene mixture was magnetically stirred for about 3 hours whereby the rubber was completely dissolved. The temperature of the solvent mixture was maintained at about 28-30° C.

An emulsifier solution of 2% Nekal BX dry (BASF, 68% sodium alkyl napthalene sulphonate) was prepared be dissolving 18 g of Nekal BX dry in 900 mL water and adjusting the pH to 10.5-11.0 with a few drops of 3% potassium hydroxide solution.

A polyisoprene rubber/additives/solvent emulsion was then prepared by slowly pouring the rubber/additive/solvent solution into the emulsifier solution which was stirred with a laboratory Silverson L4RT mixer fitted with a Square Hole High Shear Screen™ at 4400-4600 rpm. After stirring for 5 minutes at this speed, the mixer speed was increased to 4900-5100 rpm and stirring continued for about 10 minutes. The mixer speed was then reduced to about 1000 rpm and stirring continued for about 5 minutes during which time the foams that were formed break. No excessive foaming was noted under these conditions.

The emulsion was concentrated by adding 0.5 g of sodium alginate (obtained from Kimitsu Chemical Industries, Japan) dissolved in 25 mL of water and stirring at about 1500 rpm for 5 minutes. The mixture was filtered through a muslin cloth and then poured into a separatory funnel. After leaving the mixture for about 16-20 hours, the emulsion separated into 2 layers. An upper layer was a concentrated emulsion (about 810 mL) and a lower aqueous layer contained a small amount of emulsion, which was drained off.

The organic solvents pentane/DCM/toluene were stripped off from the concentrated emulsion by heat evaporation in a Buchi rotary evaporator by heating the emulsion in an evaporating flask partially immersed in a water bath at a temperature of about 45° C. for 3 hours followed by 50° C. for 4 hours. The evaporating flask was rotated at about 210 rpm so that a fresh thin film of the emulsion was continuously formed, thereby increasing the surface area for evaporation to occur. The solvent vapor was condensed and recovered by circulating ethylene glycol at a temperature of about −15° C. to −25° C. through the cooling coil of the evaporator and also immersing the receiving flask of the evaporator in a bath of ethylene glycol at the above temperature. After that, toluene which has a higher boiling point, was evaporated at about 60° C. under reduced pressure of about 100 torr for 4 hours. The weight of the concentrated latex was 246.2 g.

The latex was further concentrated by creaming using sodium alginate. 0.25 g sodium alginate dissolved in 15 mL water was added to the latex and mixed well by stirring. The mixture was then transferred into a separatory funnel and left for 10 days during which the mixture separated into two layers. An upper layer contained concentrated latex and a lower layer contained a slightly turbid aqueous solution with a little latex. The lower aqueous layer was drained off and a concentrated latex was obtained. The latex was filtered through a muslin cloth and its pH was adjusted to 10.95 with 5% potassium hydroxide solution. The weight of concentrated latex obtained was 42.16 g with a total solids content of 55.4%. The mean volume diameter of the particles was 0.69 micrometers.

This latex was compounded with 0.75 phr sodium caseinate added as aqueous solution, 1.25 phr sulfur added as dispersion, 0.5 phr zinc oxide added as dispersion, and 0.69 phr ZMBT added as dispersion. Water was added to dilute the mixture to a total solids content of about 45% and the pH of the compounded latex was adjusted to about 10.5 with a dilute potassium hydroxide solution. The latex was filtered through a muslin cloth into a beaker and was then covered and stirred with a magnet for 20 hours at ambient temperature (26-28° C.). Latex films were prepared by casting 7 to 8 g of latex on leveled glass plates having an enclosed area of 60 mm by 100 mm. The latex was left to dry for about 48 hours. Calcium carbonate powder was applied on the surfaces of the dried films and the films were stripped off the glass plates. The films were then leached in water at 70° C. for 1 hour and were hung to dry in the air for 30 minutes. They were then cured in hot air oven at 135° C. for 20 minutes.

Dumbbell specimens of the cured films were cut for physical testing using ASTM Die D and tested according to ASTM D412-98a method as shown in Table 4 below.

Example 7—Polyisoprene Latex with Additives Wingstay L, ZDEC, DPG and SIS (Vector 4111A)

The copolymer of polyisoprene used in this example was an SIS triblock copolymer with the trade name Vector 4111A (obtained from Dexco Polymers) that has a styrene content of 18%. A solution was prepared by dissolving 0.44 g Wingstay L (obtained from Goodyear, 2 phr) in 60 mL DCM (obtained from Merck), dissolving 0.22 g DPG (obtained from Flexsys, 1 phr) in 20 mL DCM, dissolving 0.165 g ZDEC (obtained from Flexsys, 0.75 phr) in 20 mL DCM, dissolving 3.3 g Vector 4111A (obtained from Dexco Polymers, 15 phr) in 30 mL toluene (obtained from Merck) and then adding the solutions one at a time to 600 mL pentane (obtained from Merck, solvent for polyisoprene) in a 1 liter beaker. The solution of Vector 4111A in toluene was very viscous and 3 mL of toluene was used for rinsing the residue sticking on the glass container.

22 g of polyisoprene rubber (Kraton IR) was cut into small pieces and slowly added into the continuously stirred solvent mixture containing the four predissolved additives described above. The beaker was covered tightly with a piece of polyethylene sheet and tied with a rubber band to minimize evaporation and the rubber/additives/pentane/DCM/toluene mixture was magnetically stirred for about 3 hours whereby the rubber was completely dissolved. The temperature of the solvent mixture was maintained at about 28-30° C.

An emulsifier solution of 2% Nekal BX dry (BASF, 68% sodium alkyl napthalene sulphonate) was prepared by dissolving 18 g of Nekal BX dry in 900 mL water and adjusting the pH to 10.5-11.0 with a few drops of 3% potassium hydroxide solution.

A polyisoprene rubber/additives/solvent emulsion was then prepared by slowly pouring the rubber/additive/solvent solution into the emulsifier solution which was stirred with a laboratory Silverson L4RT mixer fitted with a Square Hole High Shear Screen™ at 4400-4600 rpm. After stirring for 5 minutes at this speed, the mixer speed was increased to 4900-5100 rpm and stirring continued for about 10 minutes. The mixer speed was then reduced to about 1000 rpm and stirring continued for about 5 minutes during which time the foams that were formed break. No excessive foaming was noted under these conditions.

The emulsion was concentrated by adding 0.5 g of sodium alginate (obtained from Kimitsu Chemical Industries, Japan) dissolved in 25 mL of water and stirring at about 1500 rpm for 5 minutes. The mixture was filtered through a muslin cloth and then poured into a separatory funnel. After leaving the mixture for about 16-20 hours, the emulsion separated into 2 layers. An upper layer was a concentrated emulsion (about 800 mL) and a lower aqueous layer contained a small amount of emulsion, which was drained off.

The organic solvents pentane/DCM/toluene were stripped off from the concentrated emulsion by heat evaporation in a Buchi rotary evaporator by heating the emulsion in an evaporating flask partially immersed in a water bath at a temperature of about 45° C. for 3 hours followed by 50° C. for 4 hours. The evaporating flask was rotated at about 210 rpm so that a fresh thin film of the emulsion was continuously formed, thereby increasing the surface area for evaporation to occur. The solvent vapor was condensed and recovered by circulating ethylene glycol at a temperature of about −15° C. to −25° C. through the cooling coil of the evaporator and also immersing the receiving flask of the evaporator in a bath of ethylene glycol at the above temperature. After that, toluene, which has a higher boiling point, was evaporated at about 60° C. under reduced pressure of about 100 torr for 4 hours. The weight of the concentrated latex was 241.0 g.

The latex was further concentrated by creaming using sodium alginate. 0.25 g sodium alginate dissolved in 15 mL water was added to the latex and mixed well by stirring. The mixture was then transferred into a separatory funnel and left for 10 days whereby the mixture separated into two layers. An upper layer contained concentrated latex and a lower layer contained a slightly turbid aqueous solution with some latex. The lower aqueous layer was drained off and a concentrated latex was obtained. The latex was filtered through a muslin cloth and its pH was adjusted to 10.99 with a 5% potassium hydroxide solution. The weight of concentrated latex obtained was 41.52 g with a total solids content of 54.27%. The mean volume diameter was 0.57 micrometers.

25 g of the latex was compounded with 0.75 phr sodium caseinate added as aqueous solution, 1.35 phr sulfur added as dispersion, 0.60 phr zinc oxide added as dispersion, and 0.75 phr ZMBT added as dispersion. Water was added to dilute the mixture to a total solids content of about 45%, and the pH of the compounded latex was adjusted to about 10.5 with a dilute potassium hydroxide solution. The latex was then filtered through a muslin cloth into a beaker and was covered and stirred with a magnet for 40 hours at ambient temperature (about 26-28° C.). In this example, the latex was stirred for 40 hours instead of 20 hours as in Example 6.

The compound was converted to a cured film, as described in Example 6 above. Dumbbell specimens of the cured films were cut for physical testing using ASTM Die D and tested according to ASTM D412-98a method.

Physical properties of the cured latex films of Examples 6 and 7 were tested and compared with the ASTM D3578-05 Standard Specification for Rubber Examination Gloves, Type II classification. The results are summarized in Table 4.

TABLE 4

|  | Tensile strength (MPa) | Stress at 500% elongation, M500 (MPa) | Ultimate elongation (%) |
| --- | --- | --- | --- |
| Example 6 | 15.2 | 1.5 | 1070 |
| Example 7 | 16.4 | 1.4 | 1090 |
| ASTM D3578-05, Type II | 14.0 (minimum) | 2.8 (maximum) | 650 (minimum) |

As indicated in Table 4, the cured polyisoprene-SIS latex films of Examples 6 and 7 met the ASTM D3578-05 standards. Moreover, the stress (or modulus) at 500% elongation, M500, were surprisingly low and comparable to that of the cured polyisoprene films discussed above (see Example Control above which has M500 of 1.7 MPa). A low modulus is a desirable property because the resulting product feels soft and comfortable and provides good tactile sensitivity to the user. The M500 values of the films of Examples 6 and 7 were significantly lower than that of natural rubber gloves which may have an M500 value of about 3.9 MPa (range 2.6-5.0 MPa). Polyisoprene gloves typically have M500 values of about 2.0 MPa (range 1.4-2.5 MPa).

The method of the present invention may incorporate up to 20%, preferably up to 30%, more preferably up to 40%, and most preferably up to 49% (by weight of total dispersion solids) of SIS to the dispersed phase. Typically, SIS cannot be milled down to form dispersions such as the ones used for sulfur, vulcanization accelerators, antioxidants, etc. because it is not a hard solid and a commercial SIS latex is not available. Thus, SIS cannot be blended with polyisoprene latex and made into a product using conventional methods.

An advantage of using SIS in combination with elastomers such as polyisoprene is that SIS is significantly less expensive than polyisoprene and the amount of polyisoprene used in the latex may be reduced by incorporating SIS, thus reducing the cost of the raw materials. By incorporating SIS in the dispersed phase, improved tear strength, puncture strength, solvent resistance, and degradation resistance properties, as well as processing advantages may be obtained.

The method described in Examples 6 and 7 is not limited to the addition of SIS to elastomers such as polyisoprene. As noted above, other polymers may also be incorporated with the elastomer using the process of the invention. In addition, SIS may be combined with the elastomer without additives. An elastomer-SIS latex without such additives may then be converted to a cured film by using the methods discussed above.

Advantages of the latex of the invention, process of making the latex, and articles manufactured from the latex include improved film forming (less surfactant/emulsifier compared to conventional composition), performance modification of gloves and other articles (protection of sensitive additives), and enhanced formulation properties (formulation stability and compatibility). In addition, the latex provides improved bulk properties of gloves and other articles (softness, barrier and oxidative degradation resistance), reduced surface contamination, e.g. cleaner glove (less impurity migration to surface), increased formulation efficiency (availability of additive without diffusion loss), improved maturation process (no diffusion process of ingredients/additives), and reduced manufacturing costs (less individual additive production).

The aqueous polyisoprene latex of the invention demonstrates benefits over the Kraton product because elastomeric articles made from the inventive aqueous polyisoprene latex provide substantial improvements in performance in the various applications since a wider range of additives may be included in the latex. The improvements in the performance depend on the nature and amount of the additives dissolved in polyisoprene solution prior to emulsification. For example, the advantages of an article such as a glove made from the aqueous elastomer dispersion of the invention include mechanical properties such as barrier performance, touch-feel sensation, tactile sensitivity, tear resistance, and instrument gripping, and enhanced glove surface performances such as antimicrobial activity, antistatic property, a clean glove surface, and sweat absorption. Thus, according to the invention, additives may be selected to improve specific properties of products in a wider range of applications than previously possible.

The aqueous water-based elastomer composition of the invention may be processed to make a variety of articles including, but not limited to medical gloves, condoms, probe covers (i.e., for ultrasonic and transducer probes), dental dams, finger cots, catheters and the like. Methods for processing the composition may include, but are not limited to coagulant dipping, dispersion dipping, drying, leaching and oven curing.

What is claimed is:

1. A method of preparing an aqueous elastomer dispersion, comprising the steps of:
   preparing an elastomer/accelerator solution comprising an elastomer, an accelerator, and a solvent system;
   emulsifying the elastomer/accelerator solution in an aqueous medium to form an emulsion;
   concentrating the emulsion to form a concentrated emulsion;
   removing substantially all of the solvent system from the concentrated emulsion to form a substantially solvent-free dispersion; and
   optionally concentrating the substantially solvent-free dispersion.

2. The method of claim 1, wherein the elastomer is selected from the group consisting of polyisoprene, polychloroprene, styrene-butadiene copolymers, acrylonitrile-butadiene copolymers, styrene block copolymers, and butyl rubber.

3. The method of claim 2, wherein the elastomer has a molecular weight of about 100,000 to about 3,000,000.

4. The method of claim 2, wherein the elastomer/accelerator solution further comprises at least one selected from the group consisting of sulfur, sulfur donors, peroxide curing agents, vulcanization activators, antioxidants, stabilizers, plasticizers, antiozonants, pigments, fillers, antimicrobial agents, indicators, and additional polymers.

5. The method of claim 1, wherein an amount of the accelerator is about 0.5-49% by weight of total solids of the aqueous elastomer dispersion.

6. The method of claim 1, wherein the solvent system includes a first solvent and second solvent.

7. The method of claim 6, wherein the elastomer is soluble in the first solvent, and the accelerator is soluble in the second solvent.

8. The method of claim 6, wherein the first solvent includes one or more solvents, and the second solvent includes one or more solvents.

9. The method of claim 1, wherein the emulsifying step comprises adding an emulsifier.

10. The method of claim 9, wherein the emulsifying step further comprises mixing with a high shear mixer.

11. The method of claim 1, wherein one or both of the concentrating steps comprise adding a creaming agent.

12. The method of claim 11, wherein one or both of the concentrating steps further comprise separating a concentrate and an aqueous solution.

13. The method of claim 1, wherein one or both of the concentrating steps is carried out by centrifuging using a continuous centrifugal separator.

14. The method of claim 1, wherein the removing step comprises evaporating the solvent system from the concentrated emulsion.

15. The method of claim 1, wherein the removing step comprises heating the concentrated emulsion to evaporate the solvent system.

16. The method of claim 1, further comprising the step of adjusting the pH of the aqueous elastomer dispersion.

17. The method of claim 1, wherein the total solids content of the aqueous elastomer dispersion is about 45-65% by weight.

18. A method of making an article comprising:
   preparing an aqueous elastomer dispersion, wherein preparing the aqueous elastomer dispersion comprises:
      preparing an elastomer/accelerator solution comprising an elastomer, an accelerator, and a solvent system;
      emulsifying the elastomer/accelerator solution in an aqueous medium to form an emulsion;
      concentrating the emulsion to form a concentrated emulsion;
      removing substantially all of the solvent system from the concentrated emulsion to form a substantially solvent-free dispersion; and
      optionally concentrating the substantially solvent-free dispersion; and making an article from the aqueous elastomer dispersion.

19. The method of claim 18, wherein the article is selected from the group consisting of gloves, condoms, probe covers, dental dams, finger cots, and catheters.

* * * * *